US010378535B2

(12) United States Patent
Mahmood et al.

(10) Patent No.: US 10,378,535 B2
(45) Date of Patent: Aug. 13, 2019

(54) DAMPING ASSEMBLY

(71) Applicant: Caterpillar Inc., Peoria, IL (US)

(72) Inventors: Sana Mahmood, Albuquerque, NM (US); Dennis H Gibson, Chillicothe, IL (US)

(73) Assignee: Caterpillar Inc., Deerfield, IL (US)

( * ) Notice: Subject to any disclaimer, the term of this patent is extended or adjusted under 35 U.S.C. 154(b) by 318 days.

(21) Appl. No.: 15/341,033

(22) Filed: Nov. 2, 2016

(65) Prior Publication Data

US 2018/0119693 A1    May 3, 2018

(51) Int. Cl.
*F04B 49/22* (2006.01)
*F04B 15/08* (2006.01)
*F04B 19/22* (2006.01)
*F04B 53/10* (2006.01)

(52) U.S. Cl.
CPC ............. *F04B 49/22* (2013.01); *F04B 15/08* (2013.01); *F04B 19/22* (2013.01); *F04B 53/10* (2013.01)

(58) Field of Classification Search
CPC ........... Y10T 137/785; Y10T 138/7853; F04B 15/08; F04B 19/22; F04B 49/22; F04B 53/10
USPC ........................................................ 417/901
See application file for complete search history.

(56) References Cited

U.S. PATENT DOCUMENTS

| 4,559,786 | A | * | 12/1985 | Schuck | ..................... F01B 9/02 417/901 |
|---|---|---|---|---|---|
| 4,867,603 | A | * | 9/1989 | Chang | ..................... A01G 25/16 405/37 |
| 4,878,650 | A | * | 11/1989 | Daly | ................... F02M 51/0671 251/129.15 |
| 5,232,013 | A | * | 8/1993 | Morris | .................. F16K 15/063 137/514.7 |
| 5,240,036 | A | * | 8/1993 | Morris | .................. F16K 15/063 137/514 |
| 5,996,472 | A | | 12/1999 | Nguyen et al. | |
| 9,388,711 | B2 | | 7/2016 | Ayres et al. | |
| 2015/0369228 | A1 | | 12/2015 | Kounosu et al. | |

* cited by examiner

*Primary Examiner* — Patrick Hamo (57) ABSTRACT

A damping assembly for a valve is provided. The valve is configured to move between an open position and a close position. The valve includes a valve element and a valve stem disposed within a head. The damping assembly includes a damping chamber defined within the head. The damping assembly defines a sidewall. The damping assembly also includes a collar configured to receive the valve stem. The collar includes a collar stem. The collar also includes a collar head having an outer diameter. The collar head includes a side surface. The damping assembly includes a liquid passageway. The liquid passageway is being defined by a radial clearance between the side surface of the collar head and the sidewall of the damping chamber. The liquid passageway is configured to control a flow of a liquid as the valve moves between the open position and the closed position.

20 Claims, 5 Drawing Sheets

DAMPING ASSEMBLY

TECHNICAL FIELD

The present disclosure relates to a damping assembly, and more particularly to the damping assembly associated with a valve.

BACKGROUND

A machine, such as a large mining truck or a locomotive, may include a dual fuel engine that uses more than one fuel to power various components of the machine. The dual fuel engine operates on a mixture of a gaseous fuel, such as natural gas, and a petroleum distillate fuel, such as diesel. The gaseous fuel is introduced into a cylinder of the engine at high pressure while combustion is still in progress by the petroleum distillate fuel.

A cryogenic pump may be associated with the dual fuel engine for drawing and pressurizing the natural gas stored in a cryogenic storage tank in a liquid state (LNG). The cryogenic pump may include hydraulic actuators to pressurize the LNG present in pumping chambers of the cryogenic pump. The cryogenic pump may include a valve disposed within a housing of the cryogenic pump. The valve is configured to control flow of the LNG entering and leaving pumping chambers. During actuation, valve is subjected to wear due to impact loads occurring between the valve and the housing, which is undesirable.

U.S. Patent Publication 2015/0369228 describes a fluid intake/discharge valve body. The fluid intake/discharge valve body is utilized for suctioning a cryogenic liquefied gas fluid into a cylinder liner and discharge of the gas fluid with a piston. The intake/discharge valve body includes a valve seat body. The valve seat body includes a fluid supply portion to supply the fluid. The valve seat body also includes a fluid exhaust portion. The intake/discharge valve body also includes an intake valve biased against the fluid supply portion. The intake/discharge valve body further includes a discharge valve biased against the fluid exhaust portion. The fluid supply portion includes a supply pathway connected to a supply pipe. The fluid supply portion also includes a dividing wall having intake holes facing the intake valve. The fluid supply portion further includes a counter bore recessed portion on the dividing wall to surround the intake holes. The intake valve abuts an edge of the recessed portion when biased against the fluid supply portion. The discharge valve receives fluid pressure from a side of the discharge hole including a recessed portion disposed in a region wider than an outer periphery of the discharge hole.

SUMMARY OF THE DISCLOSURE

In one aspect of the present disclosure, a damping assembly for a valve is provided. The valve is configured to move between an open position and a close position. The valve includes a valve element and a valve stem disposed within a head. The damping assembly includes a damping chamber defined within the head. The damping assembly defines a sidewall. The damping assembly also includes a collar configured to receive the valve stem. The collar includes a collar stem. The collar also includes a collar head having an outer diameter. The collar head includes a side surface. The damping assembly includes a liquid passageway. The liquid passageway is defined by a radial clearance between the side surface of the collar head and the sidewall of the damping chamber. The liquid passageway is configured to control a flow of a liquid as the valve moves between the open position and the closed position.

In another aspect of the present disclosure, a pressurization assembly for a cryogenic pump is provided. The pressurization assembly includes a plunger. The pressurization assembly also includes a barrel. The pressurization assembly further includes a head. The pressurization assembly includes a valve element having a valve element and a valve stem. The valve is positioned within the head. The valve is configured to move between an open position and a closed position. The pressurization assembly also includes a damping assembly. The damping assembly is configured to control the movement of the valve between the open position and the closed position. The damping assembly includes a damping chamber defined within the head. The damping chamber defines a side wall. The damping assembly also includes a collar. The collar is configured to receive the valve stem of the valve. The collar is disposed within the damping chamber. The collar includes a collar stem. The collar also includes a collar head having an outer diameter. The collar head includes a side surface. The damping assembly further includes a liquid passageway. The liquid passageway is being defined by a radial clearance between the side surface of the collar head and the sidewall of the damping chamber. The liquid passageway is configured to control a flow of a liquid as the valve moves between the open position and the closed position.

In yet another aspect of the present disclosure, a cryogenic pump is provided. The cryogenic pump includes a drive assembly. The cryogenic pump also includes a pressurization assembly. The pressurization assembly includes a plunger. The pressurization assembly also includes a barrel. The pressurization assembly further includes a head. The pressurization assembly includes a valve having a valve element and a valve stem. The valve is positioned within the head. The valve is configured to move between an open position and a closed position. The pressurization assembly also includes a damping assembly configured to control the movement of the valve between the open position and the closed position. The damping assembly includes a damping chamber defined within the head. The damping chamber defines a sidewall. The damping assembly also includes a collar. The collar is configured to receive the valve stem of the valve. The collar is disposed within the damping chamber. The collar includes a collar stem. The collar also includes a collar head having an outer diameter. The collar head includes a side surface. The damping assembly further includes a liquid passageway. The liquid passageway is being defined by a radial clearance between the side surface of the collar head and the sidewall of the damping chamber. The liquid passageway is configured to control a flow of a liquid as the valve moves between the open position and the closed position.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
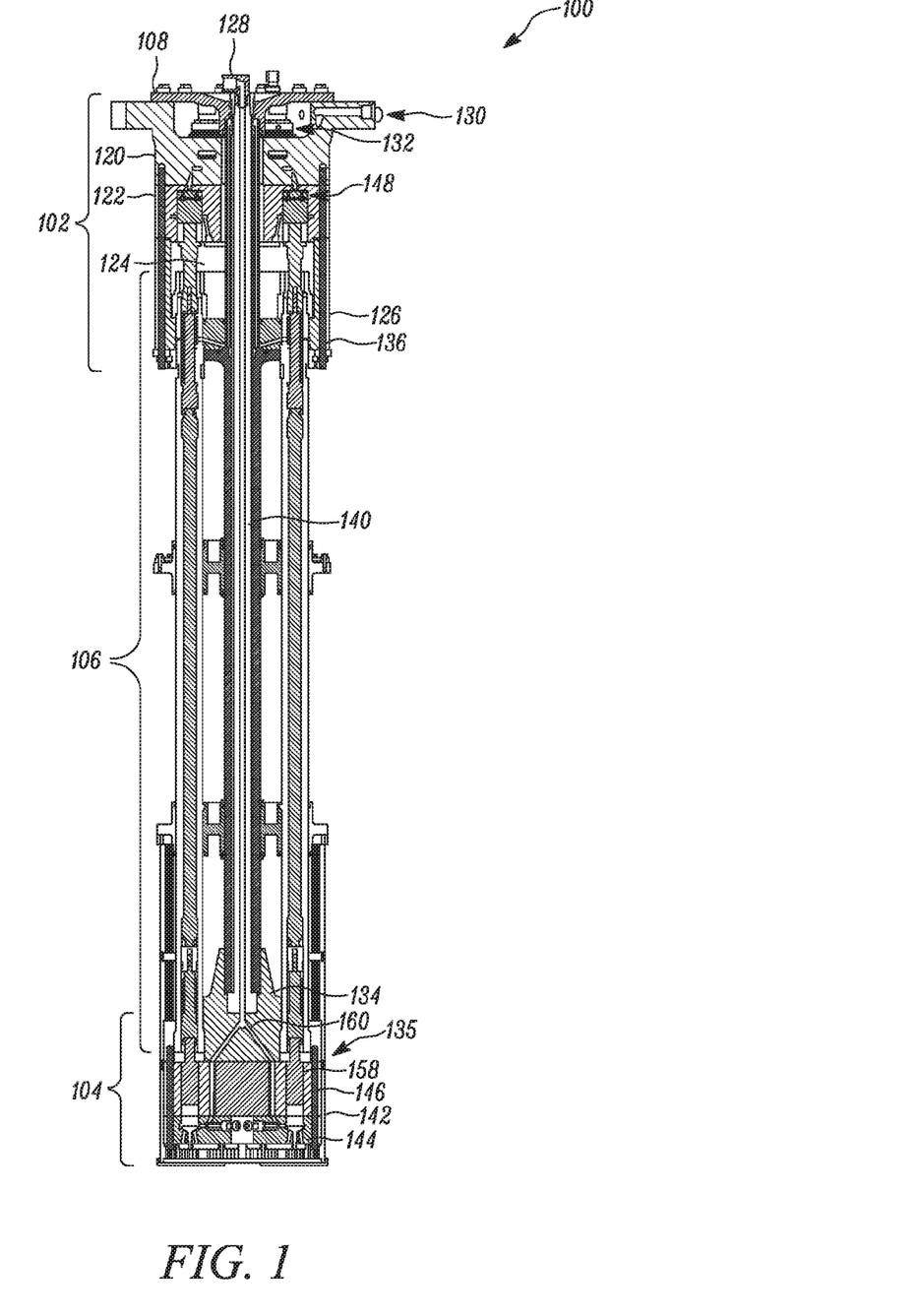
FIG. 1 is a side sectional view of an exemplary cryogenic pump, according to one embodiment of the present disclosure.

Referring to FIG. 1, an exemplary cryogenic pump 100 is shown. The cryogenic pump 100 may be used to pump various fluids, as per system requirements. In the illustrated example, the fluid is a natural gas stored in a liquid state in a cryogenic storage tank (not shown) disposed on a machine (not shown). The cryogenic pump 100 may be configured to pressurize the LNG and deliver it to an engine (not shown) of the machine.

The cryogenic pump 100 includes a drive assembly 102 and a pressurization assembly 104. The pressurization assembly 104 is operatively connected to the drive assembly 102. In the exemplary embodiment, the drive assembly 102 may embody a hydraulically operated linear actuator.

The drive assembly 102 may include a housing cap 108, a top housing 120, a piston housing 122, a hydraulic liquid reservoir 124, and a base housing 126. The top housing 120 defines a pump outlet 128. The top housing 120 includes a hydraulic liquid inlet 130. The hydraulic liquid inlet 130 is fluidly coupled to a hydraulic liquid supply (not shown). Further, the top housing 120 includes a number of spool valve assemblies 132. The spool valve assemblies 132 pressurizes a hydraulic liquid entering through the hydraulic liquid inlet 130. The spool valve assemblies 132 introduce the pressurized hydraulic liquid into a piston cavity (not shown) of the piston housing 122. A lower end of the top housing 120 is coupled to an upper end the piston housing 122. Further, a lower end of the piston housing 122 is coupled to an upper end of the base housing 126. The piston housing 122 and the base housing 126 define the hydraulic liquid reservoir 124. The hydraulic liquid reservoir 124 houses the hydraulic fluid. The top housing 120, the piston housing 122, and the base housing 126 are coupled to one another via a number of first fastening members 136. The first fastening members 136 may include any one of a screw, bolt, rivet, pin, etc.

The cryogenic pump 100 includes a push rod assembly 106. The push rod assembly 106 extends between the drive assembly 102 and the pressurization assembly 104. The push rod assembly 106 includes components that are intended to actuate the components in the pressurization assembly 104. The push rod assembly 106 includes a tube discharge 140. The tube discharge 140 defines the pump outlet 128.

The pressurization assembly 104 forms a lower portion of the cryogenic pump 100. The pressurization assembly 104 includes components that are intended to come in contact with the liquid to be pumped by the cryogenic pump 100. The components of the pressurization assembly 104 may be constructed from materials rated for cryogenic service. The pressurization assembly 104 and its components will be now described in greater detail with reference to FIGS. 1 and 2.

Figure 2:
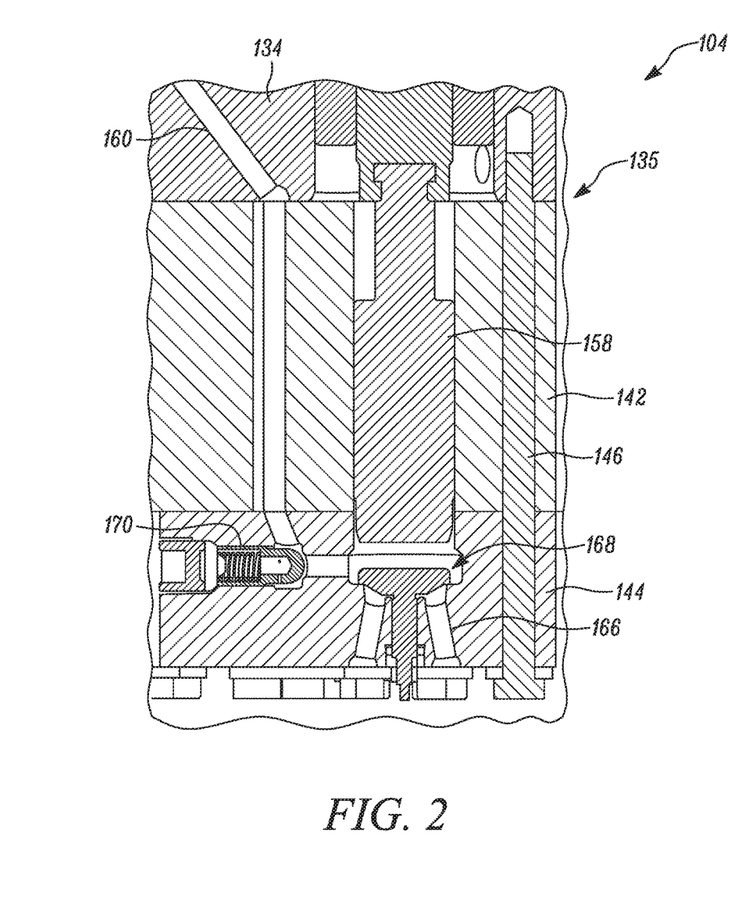
FIG. 2 is an enlarged partial side sectional view of a pressurization assembly of the cryogenic pump of FIG. 1.

As shown in FIGS. 1 and 2, the pressurization assembly 104 of the cryogenic pump 100 includes a manifold 134.

Further, the pressurization assembly 104 includes a number of pumping elements 135. In the illustrated example, the pressurization assembly 104 includes six pumping elements 135. Alternatively, the number of pumping elements 135 may vary based on system requirements. One of the pumping elements 135 will now be explained in detail below. However, it should be noted that the description provided below is equally applicable to other pumping elements 135, without limiting the scope of the disclosure.

The pumping element 135 includes a barrel 142. The barrel 142 is coupled to a lower end of the manifold 134. The pumping element 135 includes a plunger 158. The plunger 158 moves within the barrel 142. Further, the pumping element 135 includes a head 144. The manifold 134, the barrel 142, and the head 144 are coupled to one another via second fastening members 146. The second fastening members 146 may include any one of a screw, bolt, rivet, pin, etc.

Referring to FIG. 1, the cryogenic pump 100 includes a number of hydraulic actuators 148. In the present example, the cryogenic pump 100 includes six hydraulic actuators 148, one hydraulic actuator 148 corresponding to each pumping element 135.

Figure 3:
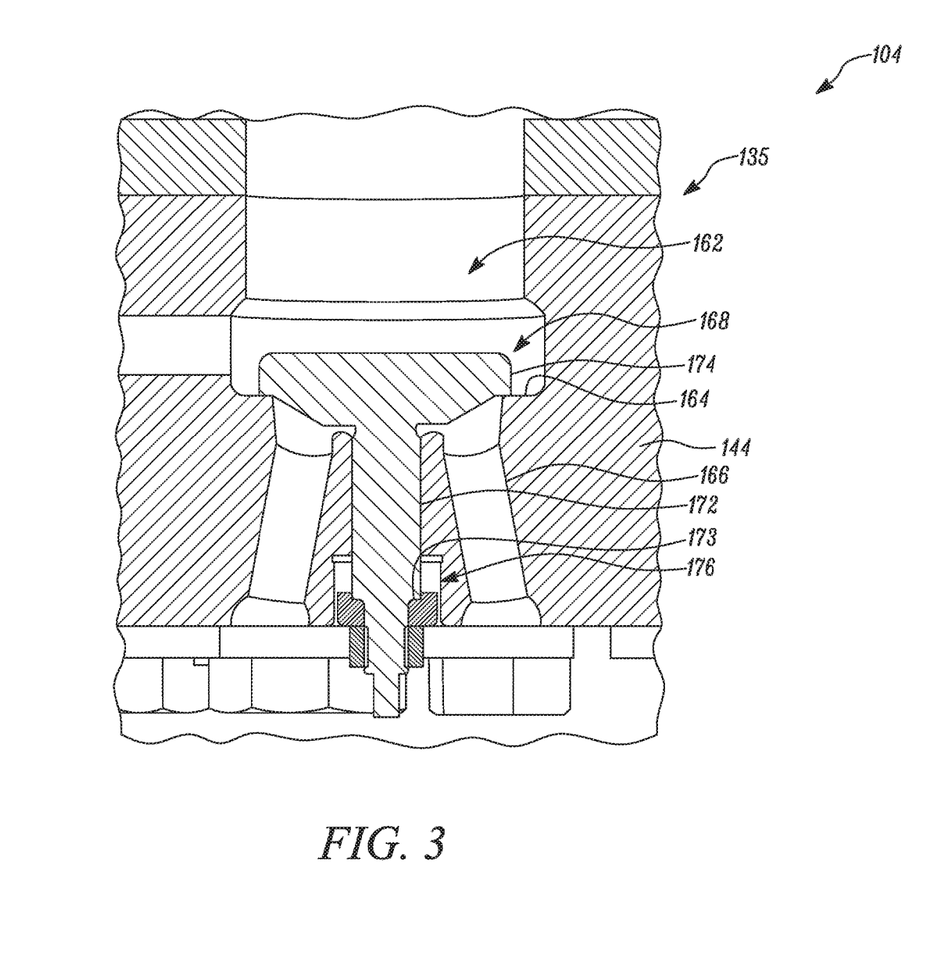
FIG. 3 is an enlarged partial side sectional view of the pressurization assembly of FIG. 2, showing a valve in a closed position.

Referring to FIGS. 2 and 3, the pressurization assembly 104 includes the manifold 134. The manifold 134 defines a number of outlets 160 corresponding to each of the pumping elements 135. The outlets 160 extend from the head 144 of the pumping element 135 towards the manifold 134. The outlets 160 converge in the manifold 134 to define the pump outlet 128 (shown in FIG. 1). Further, the pumping element 135 includes a pumping chamber 162 (shown in FIG. 3) and a valve seat 164 (shown in FIG. 3). More particularly, the head 144 defines the pumping chamber 162 and the valve seat 164. Further, the head 144 include a pump inlet 166. The pressurization assembly 104 that is submerged in the cryogenic storage tank allows the liquid stored in the cryogenic storage tank to enter into the pumping chamber 162 via the pump inlet 166.

The pumping element 135 includes a valve 168 and an outlet check valve 170 (shown in FIG. 2). The valve 168 is embodied as an inlet check valve, and will be hereinafter interchangeably referred to as the inlet check valve 168, without limiting the scope of the present disclosure. The inlet check valve 168 moves between a closed position (see FIG. 3) and an open position (see FIG. 4). The movement of the inlet check valve 168 from the closed position to the open position selectively allows the liquid from the cryogenic storage tank to flow into the pumping chamber 162. The liquid from the pumping chamber 162 then flows towards the respective outlet 160. Further, the outlet check valve 170 selectively allows the liquid to be introduced in the respective outlet 160.

Figure 4:
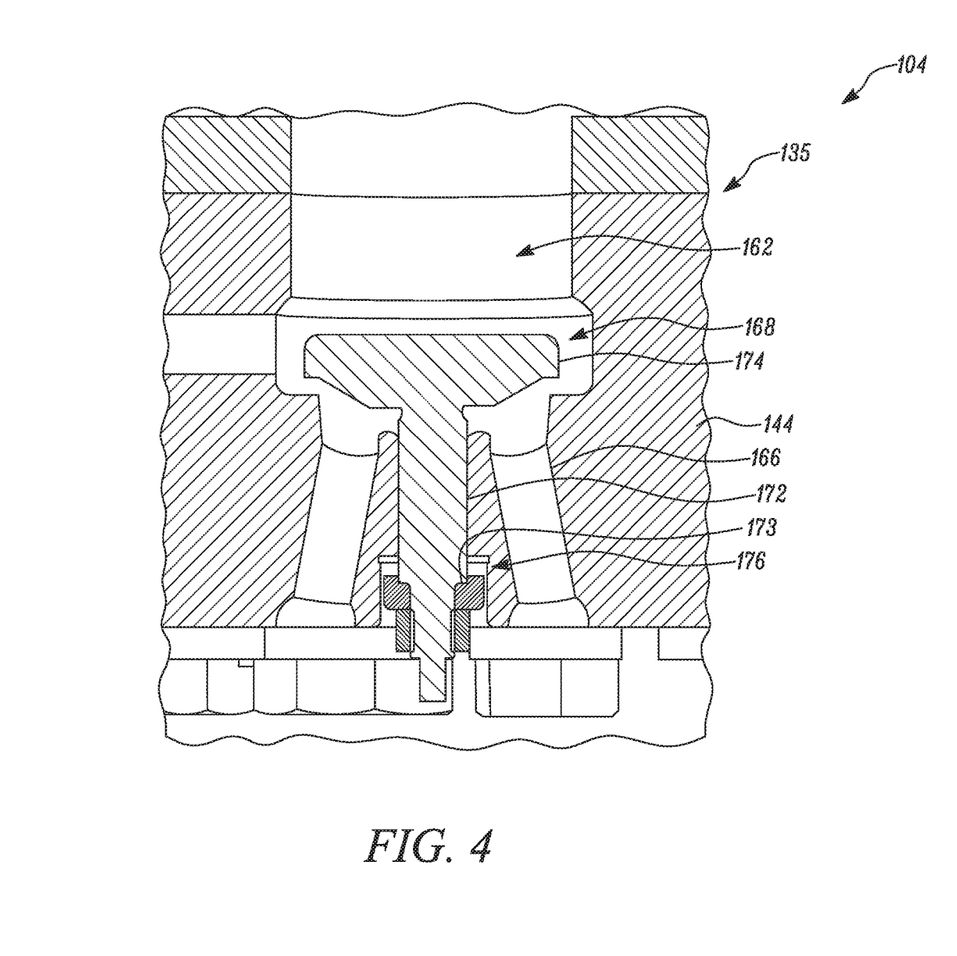
FIG. 4 is an enlarged partial side sectional view of the pressurization assembly of FIG. 2, showing the valve in an open position.

Referring now to FIGS. 3 and 4, the inlet check valve 168 includes a valve stem 172 and a valve element 174. The valve stem 172 includes a stepped portion 173. The valve element 174 is disposed within the pumping chamber 162. In the closed position of the inlet check valve 168, the valve element 174 engages the valve seat 164 of the pumping chamber 162 closing the pump inlet 166. In the open position of the inlet check valve 168, the valve element 174 moves in an upward direction allowing the liquid from the cryogenic storage tank to flow through the pump inlet 166, and into the pumping chamber 162.

Further, the pressurization assembly 104 of the present disclosure includes a damping assembly 176. The damping assembly 176 controls the movement of the inlet check valve 168 between the open position and the closed position.

Figure 5:
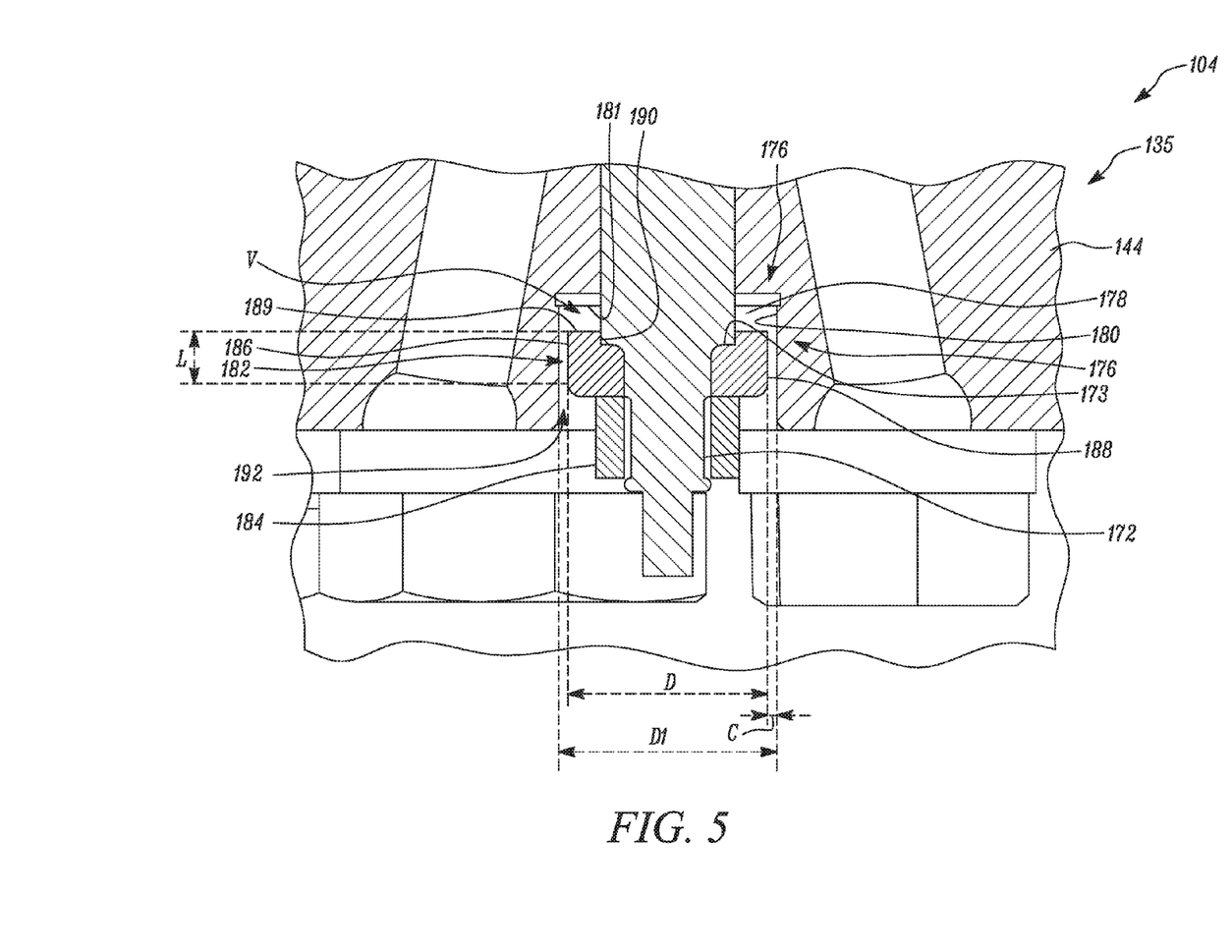
FIG. 5 is an enlarged partial side sectional view of a damping assembly associated with the valve of the pressurization assembly of FIG. 2, according to one embodiment of the present disclosure.

Referring to FIG. 5, the damping assembly 176 includes a damping chamber 178. The damping chamber 178 having a diameter "D1" is defined within the head 144. The damping chamber 178 receives the liquid stored in the cryogenic storage tank. The damping chamber 178 defines a sidewall 180 and a top wall 181. The damping assembly 176 includes a collar 182. The collar 182 receives the valve stem 172 of the inlet check valve 168. The collar 182 is disposed within the damping chamber 178. Further, the collar 182 cooperates with the liquid within the damping chamber 178 to provide a drag to the inlet check valve 168. The shape of the collar 182 is selected such that it corresponds to the shape of the damping chamber 178. In the illustrated example, the collar 182 is disc shaped. Further, the collar 182 is concentric with the valve stem 172 of the inlet check valve 168. Alternatively, an axis of the collar 182 may be eccentric with respect to an axis of the valve stem 172, without limiting the scope of the disclosure. The collar 182 includes a collar stem 184.

The collar 182 includes a collar head 186 having an outer diameter "D". It should be noted that the outer diameter "D" of the collar head 186 is less than the diameter "D1" of the damping chamber 178. Further, the collar head 186 includes a side surface 188, a top surface 189, and an annular groove 190. Further, the groove 190 receives the stepped portion 173 of the valve stem 172.

The side surface 188 of the collar head 186 defines a leak length "L". Further, an initial volume "V" of the damping chamber 178 is defined above the top surface 189 of the collar head 186. More particularly, each of the top wall 181, the sidewall 180 of the damping chamber 178, the top surface 189 of the collar head 186, and the valve stem 172 together define the initial volume "V" of the damping chamber 178, when the inlet check valve 168 is in a closed position. In the illustrated example, the collar 182 is concentrically disposed within the damping chamber 178. Alternatively, the collar 182 may be eccentrically disposed within the damping chamber 178.

Further, the damping assembly 176 includes a liquid passageway 192. The liquid passageway 192 is defined by a radial clearance "C" between the side surface 188 of the collar head 186 and the sidewall 180 of the damping chamber 178. The liquid passageway 192 controls a flow of the liquid as the inlet check valve 168 moves between the open position and the closed position. More particularly, as the inlet check valve 168 moves upwards from the closed position to the open position, the liquid passageway 192 allows some amount of the liquid within the damping chamber 178 to flow therethrough, such that a pressure develops in the damping chamber 178. The pressure developed provides a damping of the inlet check valve 168.

The damping of the inlet check valve 168 depends on factors such as the initial volume "V" of the damping chamber 178 and amount of liquid that flows through the liquid passageway 192. Further, the amount of liquid that flows through the liquid passageway 192 in turn depends on the diameter "D1" of the damping chamber 178, the radial clearance "C", and the leak length "L".

Further, the radial clearance "C" is sized to achieve required damping of the inlet check valve 168, based on system requirements. A value of the radial clearance "C" may vary based on factors such as the initial volume "V" of the damping chamber 178, the leak length "L", the diameter "D1" of the damping chamber 178, and the outer diameter "D" of the collar head 186. For example, if a difference between the outer diameter "D" and the diameter "D1" is too large, a time required to build up the desired pressure in the damping chamber 178 may increase, and in some situations, the desired pressure may not be achieved within the damping chamber 178. Thus, the diameter "D1" of the damping chamber 178 and the outer diameter "D" of the collar head 186, is selected such that the pressure required for the damping of the inlet check valve 168 is built within the damping chamber 178.

Also, the radial clearance "C" depends on the leak length "L". For example, a longer leak length "L" increases the pressure within the damping chamber 178. Thus, the leak length "L" is configured such that the pressure required to achieve necessary damping of the inlet check valve 168 is maintained within the damping chamber 178.

Furthermore, the radial clearance "C" depends on the initial volume "V" of the damping chamber 178. The initial volume "V" is sized such that the pressure developed during an outflow of the liquid from the damping chamber 178 is maintained to attain the necessary damping conditions of the inlet check valve 168. For example, if a value of the initial volume "V" is large, the time required to build up the desire pressure in the damping chamber 178 may increase, and in some situations, the desired pressure may not be achieved within the damping chamber 178. Thus, the initial volume "V" is sized such that the pressure required for the damping of the inlet check valve 168 is built within the damping chamber 178.

In one example, the value of the radial clearance "C" may lie a range between about 30 microns and 60 microns, approximately. In one example, the value of the radial clearance "C" may be 40 microns. In some examples, an iterative method is applied to arrive at the optimal value of the radial clearance "C", based on the diameter "D1" of the damping chamber 178, the leak length "L", the initial volume "V", and the outer diameter "D" of the collar head 186.

INDUSTRIAL APPLICABILITY

The present disclosure relates to the damping assembly 176 of the cryogenic pump 100 that may be associated with various liquid pumping systems used in industries, such as mining, construction, farming, etc. Moreover, the cryogenic pump 100 may be used in any application requiring the pumping of cryogenic fluids. For example, the cryogenic pump 100 of the present disclosure has particular applicability to the pumping of the natural gas, such as LNG, at high pressures in fuel delivery systems for engines associated with machines, such as, locomotives and large mining trucks.

Referring now to FIGS. 1 and 2, the pressurized hydraulic liquid from each of the spool valve assemblies 132 actuates the respective hydraulic actuators 148. The hydraulic actuators 148 actuates the plunger 158 of the pumping element 135 to move, which in turn pressurizes the liquid present in the pumping chamber 162 (see FIG. 4). The pressurized liquid is directed into the manifold 134 which defines the pump outlet 128 for the pressurized liquid to flow out of the cryogenic pump 100.

As the plunger 158, moves back to its original position it creates a vacuum in the pumping chamber 162, which in turn causes the inlet check valve 168 to move from the closed position (see FIG. 3) to the open position (see FIG. 4). The movement of the valve element 174 of the inlet check valve 168 to the open position allows the liquid in the cryogenic storage tank to flow into the pumping chamber 162, via the pump inlet 166. Further, the damping assembly 176 controls the movement of the inlet check valve 168. More particularly, as the inlet check valve 168 moves from the closed position to the open position, the collar 182 cooperates with the liquid in the damping chamber 178 of the damping assembly 176 provides the drag to the inlet check valve 168 thereby providing the damping effect.

The damping assembly 176 shown in FIGS. 3 to 5 acts as a liquid damper and provides the drag to the inlet check valve 168 in order to prevent wear of the valve element 174 and the valve seat 164. More particularly, the damping assembly 176 includes the damping chamber 178. The liquid present in the damping chamber 178 selectively flows out into the cryogenic storage tank during the movement of the inlet check valve 168 from the closed position to the open position. Further, the collar 182 cooperates with the liquid present in the damping chamber 178 to provide the drag to control the movement of the inlet check valve 168 from the closed position to the open position, thereby preventing wear of the valve element 174 and the valve seat 164.

The damping assembly 176 improves durability of the valves and also reduces the overall costs associated with the replacement of the valves due to wear. The damping assembly 176 extends the life of the inlet check valve 168, thereby reducing downtime generally caused due to replacement of the valves within cryogenic pumps. Further, the damping assembly 176 also provides an effective solution to control the flow of the liquid into the pumping chamber 162. More particularly, the damping assembly 176 controls the movement of the inlet check valve 168, thereby allowing only some amount of the liquid to flow into the pumping chamber 162.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A damping assembly for a valve, the valve configured to move between an open position and a closed position, wherein the valve includes a valve element and a valve stem disposed within a head, the damping assembly comprising:
   a damping chamber defined within the head, wherein the damping chamber defines a sidewall;
   a collar configured to receive the valve stem, wherein the collar is disposed within the damping chamber, and wherein the collar includes:
   a collar stem; and
   a collar head having an outer diameter, wherein the collar head includes a side surface; and
   a liquid passageway being defined by a radial clearance between the side surface of the collar head and the sidewall of the damping chamber,
   wherein the liquid passageway is configured as the only liquid passageway to the damping chamber to control a flow of a liquid as the valve moves between the open position and the closed position.

2. The damping assembly of claim 1, wherein a damping of the valve depends on at least one of the radial clearance, a leak length, a diameter of the damping chamber, and an initial volume of the damping chamber.

3. The damping assembly of claim 2, wherein the leak length is defined along the side surface of the collar head.

4. The damping assembly of claim 2, wherein the initial volume of the damping chamber is defined above a top surface of the collar head.

5. The damping assembly of claim 1, wherein the collar is concentrically disposed within the damping chamber.

6. The damping assembly of claim 1, wherein the collar head is received within the damping chamber, the collar head defining a groove that receives a stepped portion of the valve stem.

7. The damping assembly of claim 1, wherein the head includes a valve seat, the valve element being configured to engage the valve seat as the valve moves to the closed position.

8. The damping assembly of claim 1, wherein the collar is configured to cooperate with the liquid in the damping chamber to provide a drag to the valve, during movement of the valve between the open position and the closed position, including when the valve moves from the closed position to the open position.

9. The damping assembly of claim 1, wherein the head includes a plurality of inlets that allow passage of the liquid there through during the movement of the valve element between the open position and the closed position.

10. A pressurization assembly for a cryogenic pump, the pressurization assembly comprising:
    a plunger;
    a barrel;
    a head;
    a valve having a valve element and a valve stem positioned within the head, wherein the valve configured to move between an open position and a closed position; and
    a damping assembly configured to control the movement of the valve between the open position and the closed position, the damping assembly comprising:
    a damping chamber defined within the head, wherein the damping chamber defines a sidewall;
    a collar configured to receive the valve stem of the valve, wherein the collar is disposed within the damping chamber, and wherein the collar includes:
    a collar stem; and
    a collar head having an outer diameter, the collar head includes a side surface; and
    a liquid passageway being defined by a radial clearance between the side surface of the collar head and the sidewall of the damping chamber, wherein the liquid passageway is configured to control a flow of a liquid as the valve moves between the open position and the closed position,
    wherein an entirety of an inner surface of the collar head is fixed to and directly contacts the valve stem such that the collar moves with the valve stem as the valve moves between the open position and the closed position.

11. The pressurization assembly of claim 10, wherein a damping of the valve depends on at least one of the radial clearance, a leak length, a diameter of the damping chamber, and an initial volume of the damping chamber.

12. The pressurization assembly of claim 11, the leak length is defined along the side surface of the collar head.

13. The pressurization assembly of claim 10, wherein the collar head is received within the damping chamber, the collar head defining a groove that receives a stepped portion of the valve stem.

14. The pressurization assembly of claim 10, wherein the head includes a valve seat, the valve element being configured to abut the valve seat as the valve element moves to the closed position.

15. The pressurization assembly of claim 10, wherein the collar is configured to cooperate with the liquid in the damping chamber to provide drag to the valve element when the valve moves from the closed position to the open position.

16. The pressurization assembly of claim 10, wherein the head includes a plurality of inlets that allow passage of the liquid there through during the movement of the valve element between the open position and the closed position.

17. A cryogenic pump comprising:
- a drive assembly; and
- a pressurization assembly operatively connected to the drive assembly, the pressurization assembly comprising:
  - a plunger;
  - a barrel;
  - a head;
  - a valve having a valve element and a valve stem positioned within the head, wherein the valve is configured to move between an open position and a closed position; and
  - a damping assembly configured to control the movement of the valve between the open position and the closed position, the damping assembly comprising:
    - a damping chamber defined within the head, wherein the damping chamber defines a sidewall;
    - a collar configured to receive the valve stem of the valve, wherein the collar is disposed within the damping chamber, and wherein the collar includes:
      - a collar stem; and
      - a collar head having an outer diameter, the collar head includes a side surface; and
    - a liquid passageway as the only liquid passageway to the damping chamber is defined by a radial clearance between the side surface of the collar head and the sidewall of the damping chamber, wherein the liquid passageway is configured to control a flow of a liquid as the valve moves between the open position and the closed position.

18. The cryogenic pump of claim 17, wherein a damping of the valve depends on at least one of the radial clearance, a leak length, a diameter of the damping chamber, and an initial volume of the damping chamber.

19. The cryogenic pump of claim 17, wherein the collar head is received within the damping chamber, the collar head defining a groove that receives a stepped portion of the valve stem.

20. The cryogenic pump of claim 17, wherein the collar is configured to cooperate with the liquid in the damping chamber to provide drag to the valve element, during movement of the valve element between the open position and the closed position.

* * * * *